July 9, 1946.　　　　M. N. STATES　　　　2,403,691
APPARATUS FOR MAKING COFFEE
Original Filed Dec. 16, 1939

Inventor
Marshall N. States
BY
Mann, Brown & Co.
Attorneys.

Patented July 9, 1946

2,403,691

UNITED STATES PATENT OFFICE 2,403,691

APPARATUS FOR MAKING COFFEE

Marshall N. States, Evanston, Ill., assignor to Robert C. Brown, Jr., Highland Park, Ill., as trustee Original application December 16, 1939, Serial No. 309,585. Divided and this application October 1, 1943, Serial No. 504,553

7 Claims. (Cl. 99—279)

This invention relates to an apparatus for preparing coffee and similar beverages.

It has been well-known for years that at least some of the substances providing coffee with its characteristic flavor and aroma are volatile in nature and subject to undesirable changes if exposed to air for any considerable period of time. Manufacturers, recognizing this fact, have exercised great care in packing their coffee to insure its arrival in proper condition. However, even when properly prepared coffees are used, coffee brewers now in use are usually unable to retain in the beverage the full value of flavor and aroma contained in the coffee itself, as they expose the solution containing the aroma giving and flavoring substances to the air at elevated temperatures for considerable periods of time, thereby boiling off or evaporating the materials most desirable in the finished product.

Therefore, an object of this invention is to provide a brewing apparatus whereby coffee and similar beverages may be prepared without substantial loss of flavoring and aroma imparting substances.

Another object is to provide an apparatus suitable for use in my process in which any reasonable amount of beverage may be prepared regardless of the capacity of the container used.

Figure 1:
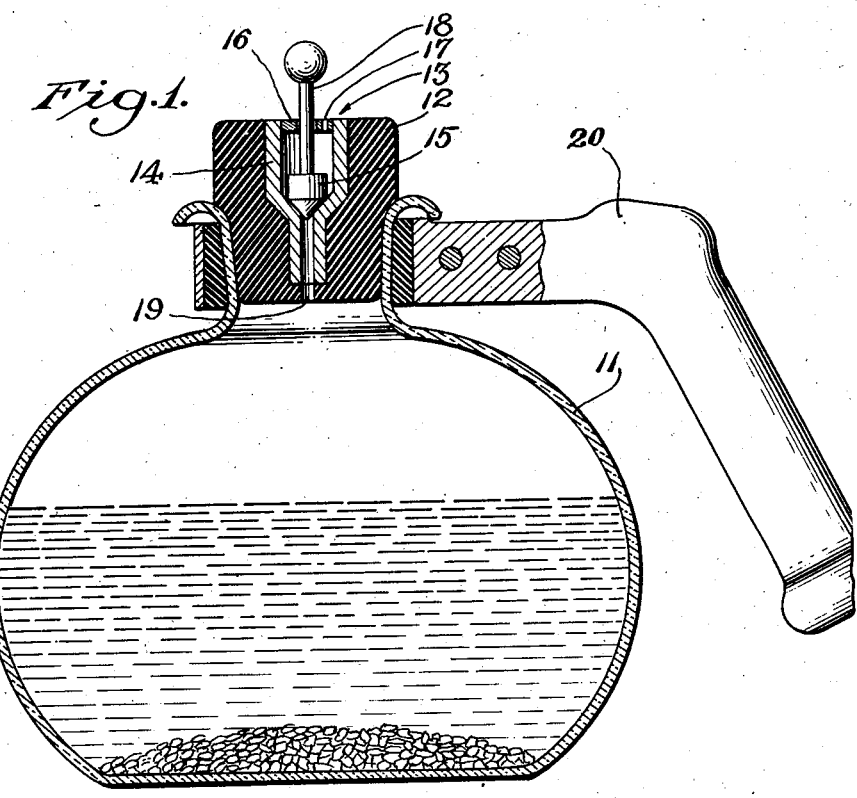
Figure 2:
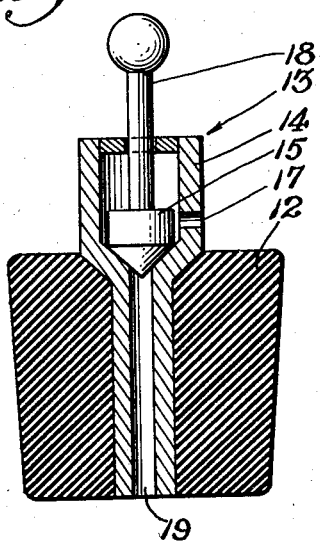
Figure 3:
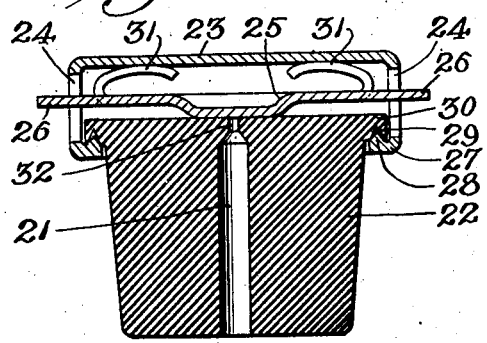

Further objects and advantages of my invention will become apparent from the following description and the accompanying drawing, in which Fig. 1 is a vertical section of my preferred form of coffee brewer;

Fig. 2 is an enlarged vertical section of a slightly modified form of stopper; and Fig. 3 illustrates another form of stopper.

For the purpose of illustration the following description of my apparatus will be limited to the preparation of coffee, but it is to be understood that the same apparatus is equally adaptable to the preparation of other similar beverages.

Referring to Fig. 1, my preferred form of coffee brewer consists of a container 11, which may be in the form of a carafe or decanter, fitted with a stopper 12, which contains a valve 13 comprising a tubular valve body 14, the lower portion of which is constricted, a valve plunger 15 operating within the valve body and seating itself in the constricted portion thereof, a valve top 16 fitting firmly into, or around, the valve body 14 in which is provided a port or ports 17 and an opening through which a valve stem 18 projects, and a valve stem 18 connected to the valve plunger 15 and projecting beyond the valve body 14 through the valve top 16 by means of which the valve plunger may be manually raised from its seat to release a vacuum formed in the container 11. A longitudinal passageway 19 is provided through the stopper 12 in which the valve 13 is firmly positioned. A handle 20 may be attached to the container for convenience in dispensing.

The container 11 may be of glass or other suitable material, and is provided with a neck of suitable diameter, flaring outwardly at the lip to aid in pouring. It may be in the form of a carafe or decanter having a globe-like container portion and an elongated neck opening, whereby the air is readily displaced by vapor and steam when heat is applied to the vessel. By means of this arrangement it is only necessary to bring the water to a boil and then remove the vessel from the source of heat. The vessel is sealed immediately before it is removed, and the brewing is effected in a partial vacuum formed by the condensation of the vapor and steam. The material of the container 11 should be moderately resistant to thermal shock, and sufficiently strong to resist atmospheric pressure when the interior of the container is substantially below atmospheric pressure.

The stopper 12 fits into the neck of the container 11 with sufficient tightness to prevent the leakage of air into the container, and is preferably made of high-grade natural or synthetic rubber compounded to resist oxidation and aging. One or more passageways 19 are provided through the stopper 12 connecting the interior of the container 11 with the atmosphere. For the purpose of illustration only one such passageway is shown in the drawing.

The valve 13 is preferably of brass or other metal which may be plated with chromium, cadmium, or nickel, if desired, and is incorporated in the passageway 19 where it is maintained normally in its closed position, preferably by gravity. When the stopper 12 is placed in the neck of the container 11 and heat is applied to the container and its contents, the valve 13 operates to allow the release of the pressure developed within the container, as the pressure is transmitted through the passageway 19 to the base of the valve plunger 15, forcing it, with its stem 18, upward, thereby allowing the displaced air and some vapor to escape through the port or ports 17. The valve 13 will assume a lower temperature than the escaping vapors, due to its higher heat conductivity and exposure to air, and therefore acts as a condenser. The droplets of condensate remaining in the valve form a liquid seal when the valve assumes the closed position, thereby eliminating the necessity of carefully machining the valve plunger and seat. When a vacuum is developed within the container 11 by the pressure of the atmosphere, it forces the valve plunger 15 firmly into its seat, and so prevents the entrance of air into the container. If desired the outlet ports 17 may be placed in the valve top 16, as shown in Fig. 1, rather than through the valve body, as shown in Fig. 2.

If desired, a stopper of the type illustrated in Fig. 3 may be used, in which case a passageway 21 is provided through the stopper 22 connecting the interior of the container 11 with the interior of the stopper cap 23, to which air has free access through openings 24. A valve 25 is provided to seal the passageway 21 under normal conditions, but is capable of release, either manually, as by lifting the lugs or projections 26, or by an excess of pressure formed within the container 11.

The stopper cap 23 may be fastened to the stopper 22 in any desired manner, preferably by means of the inwardly extending flange portion 27 of the cap 23, on the inner side of which is provided projections or teeth 28 adapted to engage with corresponding indentations 29 properly positioned in the underside of an outwardly extending flange 30 of the stopper 22.

The valve 25 is held against the passageway 21 by means of springs 31 which may be integral with the valve. The action of these springs against the stopper cap 23 not only firmly seats the valve 25 against the passageway 21, but also serves to fasten the cap 23 more firmly to the stopper by forcing the projections 28 into the corresponding indentations 29 on the underside of the stopper flange 30. The portion of the valve 25 that seals the passageway 21 is preferably depressed somewhat below the normal plane of the valve to insure a more satisfactory seal. The lugs 26 are a part of the valve 25 and extend through the openings 24 in the cap 23. By raising these lugs 26, or any one of them, the valve 25 is lifted from the passageway 21 and air is allowed free access to the interior of the container 11. As a vacuum is developed within the container 11, during my process, when this type of valve is used, I prefer to constrict the passageway 21 at its upper terminal portion, as shown at 32, thereby facilitating the release of the valve 25 and reducing the possibility of leakage.

Regardless of the type of valve used, I prefer to provide means for manually releasing the valve to destroy the vacuum formed in the container, as by raising the valve stem 18 or the lugs 26 to open the passageway into the container, for unless this is done the stopper is often quite difficult to remove.

In the use of the brewing apparatus the desired amount of ground coffee beans is placed in the container 11, and then is added the proper amount of water, either hot or cold, but not to exceed 90 percent of the capacity of the container. The stopper assembly is then inserted in the neck of the container 11 and the latter heated to boiling, after which it is removed from the source of heat and allowed to cool. The slight steam pressure so formed within the container forces the valve plunger 15 outwardly into the open position, allowing the air in the container and vapors arising from the heated solution to move through the passageway 19 into the interior of the valve 13, where at least a portion of the vapors are condensed, the excess escaping through the port or ports 17. When removed from the source of heat, the pressure within the container rapidly decreases to a point where it is insufficient to maintain the valve plunger 15 in its open position. When this point is reached the plunger 15 and stem 18 fall into the closed position on the valve seat in the constricted portion of the valve body 14, and the condensate remaining in the valve forms a liquid seal over and around the valve plunger 15, effectively preventing the entrance of air into the container. As the container 11 and its contents cool, the pressure within the container is rapidly lowered below atmospheric due to the condensation of the vapor or steam. This reduced pressure, in combination with the heat of the water, brings the aromatic and flavoring substances in the ground coffee rapidly to the surface of the particles and into solution.

The container is maintained in a sealed condition for about five minutes, or until the action or movement of the coffee particles has ceased. The vacuum is then released by raising the valve stem 18 which opens the passageway 19 into the container. As this equalizes the interior and exterior pressures, the stopper may then be easily removed. When the vacuum is released any small coffee particles remaining suspended in the liquid will become saturated and immediately sink to the bottom, a strainer or filter not being needed as all the coffee particles are completely saturated and will cling to the bottom of the flask. If, however, the chaf, or similar foreign material, is present, it may not become saturated, so a filter may be employed; but it is not necessary if a good grade of coffee is used.

As the precise reaction occurring during this process of extraction is not completely understood, I do not wish to be confined by any theory herein advanced, but for clarity of illustration I will explain the reaction to the best of my knowledge and belief. The aromatic and flavoring ingredients, which may be oil, esters, or other compounds, are more or less water soluble materials held within the cells and body of the coffee particles. To allow water to penetrate the interior cells and dissolve these ingredients it is necessary to release in some manner the entrapped air within the cells.

The entrapped air is, of course, at normal atmospheric pressure, so unless some force is applied there is no tendency for this air to move out of the cells. By reducing the pressure against this entrapped air the balance of pressures within and without the cells is disturbed, so the air will, by its own pressure, move outwardly until the internal pressure balances the external. This action is augmented by the application of heat to the air within the cells. When the entrapped air has been released the water may enter and dissolve the desired aromatic and flavoring ingredients.

Upon release of the vacuum the reverse of this process occurs, as the external pressure is then greater than that of the air remaining in the cells, so the water is forced into the cells until the external and internal pressures are again equal.

The air drawn from the coffee particles may contain certain vapors or other substances imparting flavor and aroma to the beverage. Any portion of these vapors not dissolved by the water while the air bubble is rising to the surface is retained in contact with the solution after release, as the container is closed. Likewise, any dissolved ingredients volatilized by the heat or reduced pressure will condense upon the container walls above the liquid level and return to the solution by gravity.

Observation of the brewing operation tends to substantiate this theory, as the coffee particles may be observed to become covered with small air bubbles, rise to the surface where the bubbles are released, and then sink, repeating this operation several times until the particles apparently become completely saturated with water, when they sink to the bottom of the container where they remain. Once the particles have settled to the bottom they cannot be re-suspended even by continued shaking.

From the foregoing description the advantages incident to the use of my apparatus are more or less obvious. The parts are few in number and easily cleaned. Substantially all of the aromatic and flavoring substances in the coffee are retained as the container is sealed against their escape during practically the entire operation of the apparatus. Furthermore, the minimum amount of beverage that may be prepared is not limited by the capacity of the container, as the coffee and water are in direct contact at all times. The harsh and unpleasant flavor sometimes present in coffee that has been overboiled is not present, as the continued boiling which is necessary to extract these substances is neither necessary nor desirable in the use of my apparatus.

It is not necessary that the coffee be allowed to cool extensively, as a relatively small drop in temperature produces a marked reduction in pressure; for example, as the liquid cools from 100° C. to 90° C., the pressure is reduced about 30%, and if cooled further to 80° C. the pressure is reduced about 50%. When making large quantities of coffee other structures for producing a vacuum may be used, such as an ordinary aspirator or vacuum pump connected to the upper part of the container or stopper in any desired manner; but this construction is not as desirable for ordinary household use as that herein described due to the extra equipment required.

This application is a division of my application Serial No. 309,585, filed December 16, 1939, now issued as Patent 2,338,140.

The foregoing description illustrates only the preferred embodiment of my apparatus, which is obviously capable of considerable modification. In the use of the apparatus, for example, the stopper may be inserted shortly before the container is removed from the source of heat, or the coffee particles may be added after the water is heated, or heated water may be added to the coffee particles, or the time required for the process may be reduced by rapidly cooling the container after the stopper has been inserted. The apparatus is capable of wide variation, as the shape of the container is not primarily important. The stopper may be used either with or without a valve or valves, it being essential, however, that the stopper be constructed to produce an air-tight seal across or within the neck of the container. I do not, therefore, wish to limit myself to the specific embodiment of my invention hereinbefore disclosed except as defined by the appended claims.

I claim as my invention:

1. An apparatus for preparing coffee beverage from a content of coffee and water, comprising a container of globular-like form of a material to withstand the local application of intense heat for raising the temperature of the liquid therein provided with an elongated upwardly extending neck having a passage extending upwardly therethrough and constituting the sole passage between the exterior and interior of said container, a stopper for said passage, said stopper having a passageway therethrough, and a valve for said passageway biased to a closed position for normally preventing the entrance of air to said container but permitting air and steam to escape from said container when said water is boiled within said container whereby the valve will close automatically at the end of a boiling period to produce a partial vacuum in said container for steeping said coffee when said container cools sufficiently to condense the steam therein.

2. An apparatus for preparing potable coffee comprising a carafe-shaped container of a material to withstand the local application of intense heat for raising the temperature of the liquid therein consisting of a body portion and a neck of small diameter extending upwardly therefrom and having a single passage extending longitudinally thereof and constituting the sole intake and discharge passage to and from said container, a resilient stopper for said passage, a bore extending longitudinally of said stopper, a discharge valve for said passage for permitting the escape of gas and vapor from said container but biased to closed position to automatically prevent the entrance of air to said container, and means for manually opening said valve, whereby when water and ground coffee are placed in said container, the container sealed by said stopper and the water heated to the boiling point, air and steam will escape from said container and when thereafter the container is removed from the source of heat, the ground coffee will be steeped under a partial vacuum during the cooling of said container.

3. An apparatus for preparing coffee, comprising a single container of globular-like form provided with an elongated upwardly extending neck having a passage extending upwardly therethrough and constituting the sole passage between the exterior and interior of said container, a stopper for said passage, said stopper having a passageway therethrough, a valve for said passageway biased to closed position for normally preventing the entrance of air to said container but permitting air and steam to escape from said container when a liquid is boiled within said container whereby a partial vacuum will be produced in said container for steeping said coffee when said container cools sufficiently to condense the steam therein, and means for manually manipulating said valve for breaking said partial vacuum.

4. An apparatus for preparing coffee or similar beverages by a process wherein a partial vacuum is employed to aid in the extraction of flavoring ingredients from vegetable materials comprising a single corrosion resistant container for the liquid and solids involved adapted to withstand atmospheric pressure, said container comprising a globular-like member having its upper portion greatly restricted and extending upwardly in the form of a neck of small diameter forming a narrow passage, said container being of a material to withstand the local application of intense heat for raising the temperature of the liquid therein, a removable stopper for closing said passage, said stopper having a passageway extending vertically therethrough, and a gravity valve for closing said last-named passage for permitting the passage of air and steam from said container when heat is applied to the container.

5. An apparatus for preparing coffee or similar beverages by a process wherein a partial vacuum is employed to aid in the extraction of flavoring ingredients from vegetable materials by the withdrawal of air from the minute interstices of the vegetable material during liquid submersion of the material comprising a single container for the liquid and solids involved made of a material to withstand the local application of intense heat for raising the temperature of liquid therein to substantially the boiling point, said container having a single passage between the interior thereof and the atmosphere, and a check valve for sealing said passage to automatically allow the escape of substantially all air from within the container and to prevent the entrance of external air, said automatic valve being manually releasable.

6. An apparatus for preparing coffee or similar beverages by a process wherein a partial vacuum is employed to aid in the extraction of flavoring ingredients from vegetable materials by the withdrawal of air from the minute interstices of the vegetable material during liquid submersion of the material comprising a container to hold both the liquid and solids involved, said container having an upwardly extending neck with a narrow passage constituting the sole opening to the atmosphere, and a check valve limiting fluid flow through said passage to outflow for automatically permitting the substantially free efflux and preventing the influx of air through said passageway, said means being capable of manual release.

7. An apparatus for preparing coffee or similar beverages by a process wherein a partial vacuum is employed to aid in the extraction of flavoring ingredients from vegetable materials submerged in heated liquid by the withdrawal of air from the minute interstices of the submerged material comprising a heat-resistant container with an opening for pouring the finished beverage, a stopper for said opening, said stopper having a passageway therethrough for the exit of air and vapor, a check valve for said passageway to substantially prevent the inflow of air whereby a partial vacuum will be produced in the container for steeping the vegetable material when said container cools sufficiently to condense the steam therein after the generation of the steam has substantially replaced air within the container, said check valve being located within said passageway substantially below the level of the outer end of the passageway whereby condensate formed by escaping vapors may increase the sealing effectiveness of the check valve, and means extending to the exterior of said stopper from said valve for manual release of the check valve.

MARSHALL N. STATES.